Sept. 27, 1966    A. M. SCOTT ET AL    3,275,333
DUAL LIP UNITIZED SEAL
Filed Aug. 2, 1963    2 Sheets-Sheet 1
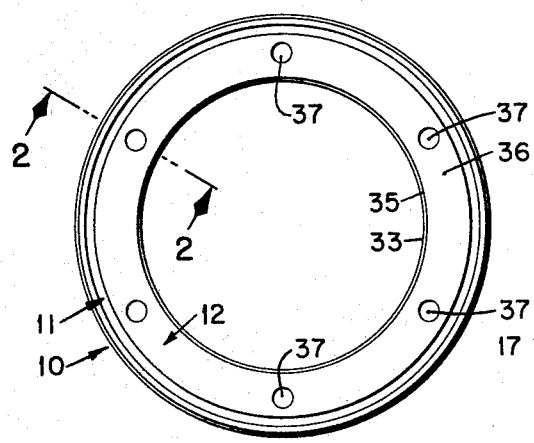
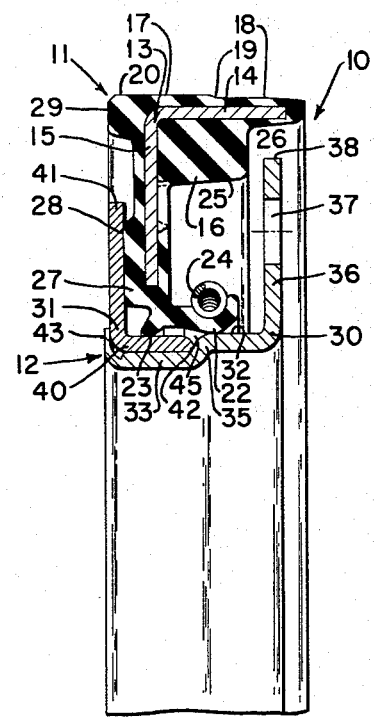
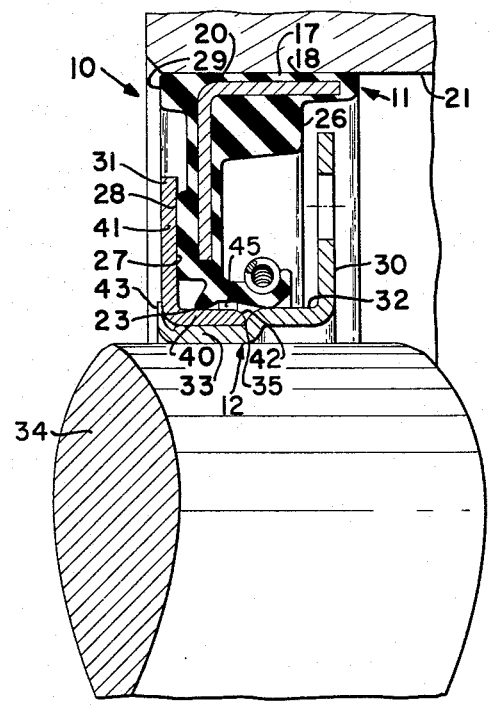
INVENTORS
ARTHUR M. SCOTT
ROBERT N. HAYNIE
BY
ATTORNEYS.

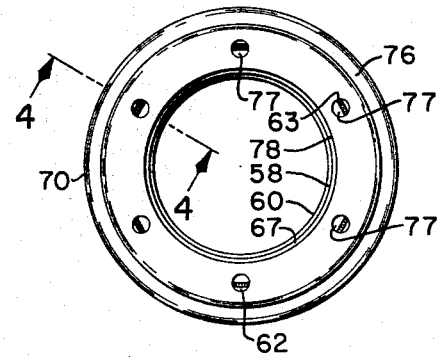
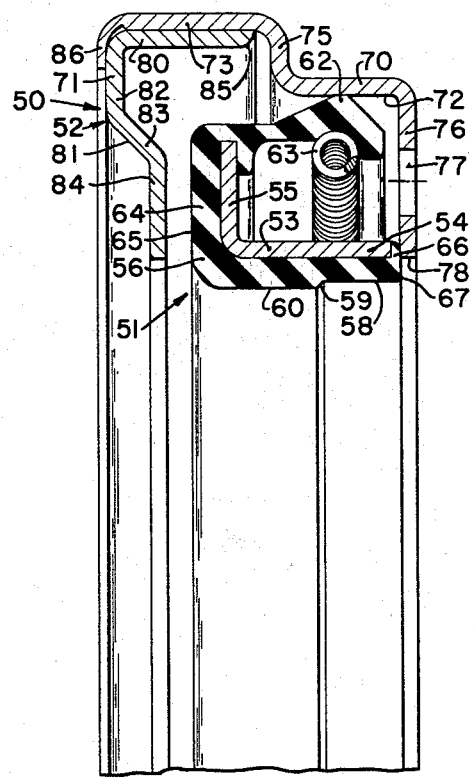
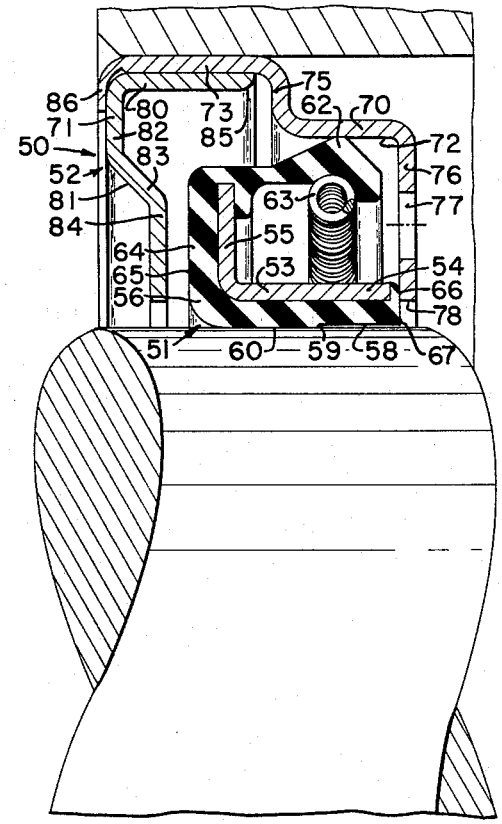
INVENTORS
ARTHUR M. SCOTT
ROBERT N. HAYNIE

3,275,333
Patented Sept. 27, 1966

3,275,333
DUAL LIP UNITIZED SEAL
Arthur M. Scott, Redwood City, and Robert N. Haynie, Los Altos, Calif., assignors to Federal-Mogul Corporation, Detroit, Mich., a corporation of Michigan
Filed Aug. 2, 1963, Ser. No. 299,546
10 Claims. (Cl. 277—39)

This invention relates to an improved unitized seal, that is, to improvements in an integral assembly of a radial shaft seal and a wear sleeve on which the seal lip runs. When installed into a machine, the wear sleeve engages and stays with one of two relatively rotating parts while the seal moves with the other relatively rotating part, so that the seal moves relatively to the wear sleeve. More particularly, the invention relates to the type of unitized seal in which the unitization is accomplished by the use to two wear sleeves that provide a radial flange at each end of the seal, the flanges enclosing and unitizing the seal assembly.

The use of two-element wear sleeves has introduced some problems. One is how to prevent leakage of lubricant between the two wear sleeves. Heretofore, this problem has usually been attacked by providing a gasket between the two wear sleeves. This addition of a gasket has added to the expense and has reduced the market otherwise available to unitized seals; it has introduced manufacturing problems, further increasing the cost; also, it has not always been successful in preventing leakage.

Another problem is that of providing a wear sleeve surface for the seal that is unaffected by installation of the wear sleeve in a shaft.

One object of this invention is to provide a less expensive and more practical unitized seal in which the necessary functions of a unitized seal and wear sleeve assembly are provided in a more efficient and less expensive structure. The invention enables the use of a sheet metal wear sleeve assembled from two parts without the use of any gasket between the two parts, yet without leakage between them.

Other objects and advantages of the invention will appear from the following description of a preferred embodiment thereof.

In the drawings:

FIG. 1 is a view in end elevation of a unitized seal embodying the principles of the invention.

FIG. 2 is an enlarged view in side elevation and in section of approximately half of the unitized seal of FIG. 1 taken along the line 2—2 in FIG. 1.

FIG. 3 is a view similar to FIG. 2 showing an installation of the unitized seal upon a shaft and in a housing.

FIG. 4 is a view like FIG. 2 of a modified form of the invention.

FIG. 5 is a view like FIG. 3 incorporating the seal of FIG. 4.

FIG. 6 is a view like FIG. 1 of the seal of FIGS. 4 and 5.

The unitized seal 10 shown in FIGS. 1 to 3 incorporates a seal assembly 11 and a two-piece wear sleeve assembly 12.

The seal assembly 11 preferably comprises a unitary, molded, rubber-covered, metal-reinforced seal, although other appropriate types may be used, as desired. The assembly 11 includes a metal reinforcing member 13, preferably having a cylindrical portion 14 and a radial flange 15, around which is molded an oil-resistant elastomeric member 16. The member 16 has an outer generally cylindrical portion 17 which lies on and is adhered to the outer periphery of the cylindrical portion 14, preferably being tapered and stepped so as to provide an entry portion 18 leading by an offset 19 to a cylindrical portion 29 which snugly engages a bore 21 (FIG. 3) when the seal is installed. The portion 20 may be made slightly larger than the bore 21 in which it is to fit, so that the rubber will flow into the smaller diameter entry or lead-in portion 18, after the lead-in portion 18 has assured easy installation. The resultant rubber lining 17 of the seal assembly 11 means that the wear sleeve assembly 12 does not have to be lined with rubber, for the seal 10 can have one metal press fit (as between the seal 11 and the wear sleeve 12) but when a seal having a metal press fit in the bore is used, then the wear sleeve is lined with elastomer.

The seal 11 is provided with a radial sealing means, preferably of the lip type. The illustrated embodiment has a pair of lips 22 and 23, both parts of the same member 16. The sealing lip 22 is the main lip which seals in the lubricant, and it is preferably provided with a spring 24. When a dual-lip structure is used, the sealing lip 23 is an auxiliary lip which seals out dirt and other foreign matter.

The elastomeric member 16 also provides a bumper portion 25 with a radial bumper surface 26 lying axially beyond all portions of the main lip 22, and a second bumper 27 has a radial bumper surface 28 axially outside all portions of the auxiliary lip 23. Beyond the bumper 27 lies a bore-engaging ring portion 29.

The wear sleeve assembly 12 incorporates a main wear sleeve 30 and an auxiliary wear sleeve 31. The wear sleeve 30 is drawn from sheet metal, and this is important. It provides a good smooth cylindrical wear surface 32 for engagement by the lip. A very important feature of the invention is that the sleeve 30 is stepped in radially to provide a portion 33 which engages and grips the shaft 34. Being set in radially from the wear sleeve portion 32 by an offsetting portion 35, the fit of the portion 33 on the shaft 34 does not affect the lip 32; moreover, this stepping, as will be seen, prevents the direct leakage of lubricant from the oil side of the seal out between the sleeves 30 and 31. The sleeve 30 also has a radial flange 36, preferably provided with a plurality of openings 37 for passage of oil therethrough. The flange 36 acts as an oil flinger when the shaft is moving, and it extends radially outwardly beyond the lip 22 to a periphery 38, so that part of the flange 36 faces the bumper surface 26 and provides one of the means by which the seal 10 is unitized. When there is engagement between the bumper surface 26 and the flange 36, oil passes in through the openings 37 to lubricate the lip 22 as it runs on the surface 32; when there is no such engagement, oil passes in both through the openings 37 and around the outer periphery 38 of the flange 35.

The other wear sleeve member 31 is a ring, also drawn from sheet metal, that is L-shaped in cross-section, having a cylindrical portion 40 and a radial portion 41. The cylindrical portion 40 is preferably the same length as the portion 33, and it terminates against the offset 35 of the member 30. Preferably the offset is the same as the thickness of the metal members 30, 31. The radial portion 41 is provided to unitize the seal 10, and it will be noted that the seal 10 can be assembled by sliding the auxiliary lip 23 onto the cylindrical portion 40 with the surface 28 of its bumper portion 27 coming up against the radial flange 41. Then the wear sleeve 31 and seal lip 22 are inserted into the wear sleeve 31, with the cylindrical portion 40 nesting within the cylindrical portion 33. Finally, while the edge 42 of the portion 40 engages the offset step 35 of the member 30, a simple spinning operation joins the two sleeve elements 30 and 31 together, by providing a locking spun-over portion 43, locking the seal assembly 11 between the flanges 36 and 41. The key thing here is that simple spinning is involved, that the pressures need not be great, and that no gasketing is involved.

Although there is no gasket, there is also no leakage between the members 30 and 31 because leakage between the sleeves 30 and 31 can occur only if oil first leaks past the main sealing lip 22. The lip 23 excludes dirt, and if something should leak in between the two wear sleeve members 40 and 33 and pass between the edge 43 and the offset 35, there will be little, if any, flow from there, for the oil has no place to go; when there are dual lips, the lips 22 and 23 ride on different wear sleeve members, on opposite sides of the step 35, and they confine such oil to the space 45 between them. But the stepped wear sleeve member 30 enables the use of two wear sleeves with unitizing metal flanges 36 and 41, confining the seal assembly 11 while at the same time there is no need for a gasket between the sleeves 30 and 31, the end 42 of the cylindrical portion 40 being outside (on the non-oil side) of the lip 22.

The seal 50 shown in FIGS. 4 and 5 is an external type unitized seal incorporating a unitary molded seal assembly 51 and a two-piece wear sleeve assembly 52.

The seal assembly 51 comprises a rubber-covered metal-reinforced seal. It includes a metal-reinforcing member 53 preferably having a cylindrical portion 54 and a radial flange 55, around which is molded an oil-resistant elastomeric member 56. The member 56 has an inner generally cylindrical portion 57 which lies on and is adhered to the inner periphery of the cylindrical portion 54, preferably being tapered and stepped so as to provide an entry portion 58 leading by an offset 59 to a cylindrical portion 60 which is adapted to snug engagement of a shaft 61 (FIG. 5). The portion 60 may be made slightly smaller than the shaft 61 in which it is to fit so that the rubber will flow into the smaller-diameter entry or lead-in portion 58, after the lead-in portion 58 has assured easy installation. The resultant rubber lining of the seal assembly 61 means that the wear sleeve assembly 52 does not have to be lined with rubber.

The seal 51 is provided with a single lip 62, which is preferably spring-urged by a spring 63. The seal 51 also has a bumper portion 64 providing a radial bumper surface 65 axially beyond all portions of the lip 62; a second bumper 66 with a radial bumper surface 67 is provided at the end of the portion 60.

The wear sleeve assembly 52 incorporates a main wear sleeve 70 and an auxiliary wear sleeve 71. The wear sleeve 70 is drawn from sheet metal, and it provides a good smooth cylindrical wearing surface 72 for engagement by the lip. The sleeve 70 has a radially out-stepped portion 73 which is the portion of the unitized seal 50 that actually engages and grips the bore 74. Being set out from the wear sleeve portion 72 by an offsetting portion 75, the fit of the portion 73 in the bore 74 does not affect the lip 62. The sleeve 70 also has a radial flange 76, preferably provided with a plurality of openings 77 for passage of oil therethrough. The flange 76 acts as an oil flinger when the shaft is moving, and it extends radially inwardly beyond the lip 62 to a periphery 78 so that part of the flange 76 faces the bumper 66 and provides one of the means by which the seal 50 is unitized. When there is engagement between the bumper surface 66 and the flange 76, oil passes in through the openings 77 to lubricate the lip 62 as it runs on the surface 72; when there is no such engagement, oil passes in both through the openings 77 and around the inner periphery 78 of the flange 76.

The other wear sleeve member 71 is a ring that is L-shaped in cross-section, also drawn from sheet metal having a cylindrical portion 80 and a generally radial portion 81. The cylindrical portion 80 is preferably the same length as the portion 73 and it terminates against the offset 75 of the member 70. The radial portion 81 is provided to unitize the seal 50, and it extends in with an outer radial portion 82, a tapered portion 83, and an inner radial portion 84. The seal 50 can be assembled by sliding the lip 72 onto the cylindrical portion 72 and then sliding the wear sleeve portion 80 into the portion 73. While the edge 85 of the portion 80 engages the offset step 75 of the member 70, a simple spinning operation joins the two sleeve elements 70 and 71 together by providing a locking spun-over portion 86, locking the seal assembly 51 between the flanges 76 and 71.

Although there is no gasket between the members 70 and 71, there is also no leakage between them, because leakage between the sleeves 70 and 71 can occur only if oil first leaks past the main sealing lip 62. Again, the stepped wear sleeve member 70 enables the use of two wear sleeves with unitizing metal flanges 76 and 81 confining the seal assembly 51, while at the same time there is no need for a gasket between the sleeves 70 and 71, the end 85 of the cylindrical portion 80 being outside (on the non-oil side) of the lip 62.

To those skilled in the art to which this invention relates, many additional changes in construction and widely differing embodiments of the invention will suggest themselves without departing from the spirit and scope of the invention as defined in the claims.

What is claimed is:

1. A unitized oil seal for use between two relatively rotating machine parts, including in combination:
   first and second metal wear sleeve members nested and locked together,
   said first member having a first radial flange and a first axial portion, said first axial portion being stepped to provide a first cylindrical portion nearer said first flange and a second cylindrical portion engaging one of said relatively rotating machine parts and more distant from said first flange and of different diameter than said first cylindrical portion and meeting that portion at a step, said first axial portion terminating in a locking rim,
   said second member having a second radial flange and a second axial portion, which is cylindrical and nests with said second cylindrical portion and of substantially the same length, engaging said step, said locking rim directly engaging said second radial flange so that said first and second radial flanges are at the opposite ends of said first axial portion, so that the width of the oil seal is substantially the distance between said first and second radial flanges, and
   a sealing member having lip means engaging said first cylindrical portion and means for non-rotatively engaging the other of said machine parts.

2. The seal of claim 1 wherein said sealing member has a second lip means engaging said second axial portion, so that said step lies between the two said lip means.

3. The seal of claim 1 wherein said sealing member has a pair of elastomeric bumpers at axial extremities outside said lip and unitary with said lip for engagement by a said flange of said wear sleeve members, when said seal is in an extreme position relative to said wear sleeves.

4. A unitized oil seal for use between a shaft and a bore, including in combination:
   first and second metal wear sleeve members nested and locked together,
   said first member having a first radially outwardly extending radial flange and a first axial portion, said first axial portion being stepped to provide a first lip-engaging cylindrical portion nearer said first flange and a second shaft-engaging cylindrical portion more distant from said first flange and of smaller diameter than said first cylindrical portion and meeting that portion at a step, said first axial portion terminating in a locking rim,
   said second member having a second radial flange and a second axial portion, which is cylindrical and nests snugly around said second cylindrical portion and of substantially the same length, engaging said step, said locking rim directly engaging said second radial flange so that said first and second radial flanges are at opposite ends of said first axial portion, and a sealing member having lip means engaging said first cylindrical portion and means for non-rotatively engaging said bore, whereby the seal is only as wide as the distance from one said radial flange to the other, plus the thicknesses of the flanges and said rim.

5. The seal of claim 4 wherein said sealing member has a second lip means engaging said second axial portion so that said step lies between said two lip means.

6. A unitized oil seal including in combination:

a pair of wear sleeve members nested and locked together, each wear sleeve member having a radial flange and an axial cylindrical portion, a first one of them having its cylindrical portion much shorter than that of a second one, said second one having a cylindrical portion that is much longer and has a terminal offset portion that nests radially within the cylindrical portion of said first sleeve, and a unitary oil seal assembly having a rigid supporting member and an elastomeric member molded to said supporting member, said elastomeric member having a cylindrical bore-engaging portion outside said supporting member and having a pair of lips, one lip riding on the cylindrical portion of said first wear sleeve while the other lip rides on the cylindrical portion of said second wear sleeve, the two lips bridging the place where the cylindrical portions of the wear sleeve meet.

7. The seal of claim 6 wherein said seal assembly has a pair of bumpers, one axially outside each said lip for engagement by a said flange of said wear sleeve when said seal is in an extreme position relative to said wear sleeves.

8. A unitized oil seal for use between a shaft and a bore, including in combination:

first and second metal wear sleeve members nested and locked together, said first member having a first radially outwardly extending radial flange and a first axial portion, said first axial portion being stepped to provide a first lip-engaging cylindrical portion nearer said first flange and a second shaft-engaging cylindrical portion more distant from said first flange and of smaller diameter than said first cylindrical portion and meeting that portion at a step, said first axial portion terminating in a locking rim, said second member having a second radial flange and a second axial portion, which is cylindrical and nests snugly around said second cylindrical portion and of substantially the same length, engaging said step, said locking rim directly engaging said second radial flange, so that said first and second radial flanges are at opposite ends of said first axial portion, and a sealing member having two lip means, one engaging said first cylindrical portion and one engaging said second axial portion, and elastomeric means for non-rotatively engaging said bore.

9. A unitized oil seal for use between a shaft and a bore, including in combination:

first and second metal wear sleeve members nested and locked together, said first member having a first radially inwardly extending radial flange and a first axial portion, said first axial portion being stepped to provide a first lip-engaging cylindrical portion nearer said first flange and a second bore-engaging cylindrical portion more distance from said first flange and of larger diameter than said first cylindrical portion and meeting that portion at a step, said first axial portion terminating in a locking rim, said second member having a second radial flange and a second axial portion, which is cylindrical, nested snugly within said second cylindrical portion and of substantially the same length, engaging said step, said locking rim directly engaging said second radial flange, so that said first and second radial flanges are at opposite ends of said first axial portion, and a sealing member having lip means engaging said first cylindrical portion and means for non-rotatively engaging said shaft.

10. The seal of claim 9 wherein said sealing member has a pair of elastomeric bumpers on opposite axial extremities out beyond said lip and integral with said lip, each for engagement by a said flange of said wear sleeve members when said seal is in an extreme position relative to said wear sleeve members.

References Cited by the Examiner

UNITED STATES PATENTS

| 2,938,744 | 5/1960 | Fritch | 277—39 |
| 3,021,161 | 2/1962 | Rhoades et al. | 277—39 X |
| 3,086,781 | 4/1963 | Hudson et al. | 277—39 |
| 3,156,474 | 11/1964 | Nelson | 277—39 |

SAMUEL ROTHBERG, *Primary Examiner.*